United States Patent [19]

Przybysz et al.

[11] Patent Number: 5,289,400
[45] Date of Patent: Feb. 22, 1994

[54] SINGLE-FLUX-QUANTUM MULTIPLY-ACCUMULATOR

[75] Inventors: John X. Przybysz, Penn Hills; Donald L. Miller, Penn Township, Westmoreland County; Joonhee Kang, Plum Boro, all of Pa.

[73] Assignee: Westinghouse Electric Corp., Pittsburgh, Pa.

[21] Appl. No.: 922,251

[22] Filed: Jul. 30, 1992

[51] Int. Cl.$^5$ .............................................. G06F 7/52
[52] U.S. Cl. ................................................ 364/759
[58] Field of Search .................... 364/759, 760, 757

[56] References Cited

U.S. PATENT DOCUMENTS

| 3,610,907 | 1/1969 | Taylor | 364/759 |
| 3,617,723 | 11/1971 | Melvin | 364/759 |
| 4,970,676 | 11/1990 | Fling | 364/759 |
| 5,124,941 | 6/1992 | Smith | 364/759 |
| 5,150,321 | 9/1992 | Keating | 364/759 |

OTHER PUBLICATIONS

K. K. Likharev and V. K. Semenov, "RSFQ Logic/Memory Family: A New Josephson-Junction Technology For Sub-Tetrahertz-Clock-Frequency Digital Systems", IEE Transactions on Applied Superconductivity, vol. 1, No. 1, Mar. 1991 (pp. 3-28).

Primary Examiner—David H. Malzahn

[57] ABSTRACT

A serial multiplier for multiplying two n-bit numbers is provided in which a shift register having a total of n destructive read out cells contains a separate bit of a first multiplicand in each cell. A string of (2n−1) non-destructive read out cells is provided to receive the second multiplicand. Each of the first n cells of the string of non-destructive readout cells contain a separate bit of the second multiplicand. Each bit of the first multiplicand is serially multiplied with the series of bits of said second multiplicand. After each such multiplication, each bit of the second multiplicand is moved to the next adjacent cell. The partial product of the multiplication is stored in a string of 2n T flip-flop cells. Each of the T flip-flop cells has a carry path to the next adjacent T flip-flop cell. Timing means are provided to regulate and initiate the multiplication.

7 Claims, 4 Drawing Sheets

SINGLE-FLUX-QUANTUM MULTIPLY-ACCUMULATOR

BACKGROUND OF THE INVENTION

1. Field Of The Invention

The present invention relates to the field of multiply-accumulators, and more particular, to the field of multiply-accumulators utilizing single-flux-quantum logic circuits.

2. Description of Related Art

High speed digital signal processing is becoming increasingly important for advanced electronic applications. High speed digital signal processing is crucial for the realization of digital bandpass interpolation filters for wide band rf systems. Josephson-junction based logic offers the potential for orders of magnitude improvement in both speed and power over equivalent semiconductor based circuits.

By utilization of a circuit architecture known as Modified Variable Threshold Logic (MVTL), an 8-bit processor was capable of operating at clock speeds of up to one gigahertz with 12 mW of power dissipation. In the MVTL circuit architecture, information is stored as voltages across Superconducting Quantum Interference Devices (SQUIDs). Although the performance of the MVTL circuit is impressive, such a circuit does not take full advantage of the inherent speed of Josephson junctions. The operating speed of MVTL circuits is limited by the use of latching gates which require an active reset in switching from a logical "ONE" to a logical "ZERO".

Recently, circuit designs for a logic family have been described in which the binary information is stored as magnetic flux in superconducting loops. Information is transmitted within such a circuit in the form of voltage pulses. Because a single-flux-quantum, $\Phi_0$ ($\Phi_0 = 2.07$ mV.ps), is used to denote each binary "ONE", this circuit architecture is referred to as Rapid Single Flux Quantum (RSFQ) logic. Clock rates of up to 200 GHz have been projected for such circuits with orders of magnitude improvements in power dissipation over MVTL circuits. In addition, the operating margins of RSFQ circuits are larger than for comparable MVTL circuits.

In Likharev and Semenov, "RSFQ Logic/Memory: A New Josephson-junction Technology for Sub-Terahertz-Clock-Frequency Digital Systems," IEEE Trans. on Applied Superconductivity, Vol. 1, pp. 3–28 (March 1991) an RSFQ serial multiplier is disclosed which is formed of various logic elements including non-destructive readout (NDRO) cells, destructive readout (DRO) cells, and one-bit full adders (FA). A block diagram of this multiplier 10 is shown in FIG. 1.

To multiply two n-bit numbers, A and B, in multiplier 10 [$A = (a_{n-1}, a_{n-2}, \ldots, a_0)$ and $B = (b_{n-1}, b_{n-2}, \ldots, b_0)$], the digits of B are first read into the NDRO cells 12 using a series of timing pulses $T_B$. Each NDRO cell 12 will contain a separate bit of the B multiplicand. Multiplication is accomplished by multiplying each bit of the A multiplicand with the series of bits of the B multiplicand loaded into the NDRO cells 12. During such multiplication, the state of $a_i$ sets the DRO cells 14. If $a_i = 1$, a pulse is sent to the set inputs of the DRO cells 14. If $a_i = 0$, no pulse is sent. A timing pulse $T_A$ is used to read out the DRO cells 14, with the output ($a_i$) triggering the NDRO cells 12 in the event $a_i = 1$. In this way, the partial product $[p_i = a_i \times B = (a_i b_{n-1} + a_i b_{n-2} + \ldots + a_i b_0)]$ is generated in the string of full adders 16.

The pulse $T_A$ also outputs the sum bits of the full adders 16 to redirect the carry bits to inputs on the same adders. The DRO cells 14 are then set by the next bit ($a_1$) of the A multiplicand and the procedure is repeated. At each pulse $T_A$, one bit of the product ($p_i$) emerges from the full adder 16 string. After 2n cycles, the multiplication is complete. Projected performance of multiplier 10 is 0.5 billion multiplications per second for 32-bit × 32-bit multiplications.

While RSFQ logic offers high-speed and low-power operation, and although all of the required logic elements have been successfully modeled, this architecture still lacks a reliable single-bit full adder 16. Full adders 16 proposed to date have proved to have limited operating margins, particularly for reset. Since the one-bit full adder 16 is a basic building block of a serial multiplier 10, this poses a serious limitation. Consequently, there is a need for a serial multiplier which does not rely on a full adder cell which nevertheless offers the benefits of RSFQ digital processing with added reliability.

SUMMARY OF THE INVENTION

A serial multiplier utilizing RSFQ digital processing logic is provided which does not rely on a full adder cell. Instead, a string of T flip-flops are provided. The T flip-flop cells receive the partial bit products. Carry pulses from a given flip-flop are fed into the gate of the adjacent flip-flop to form a binary counter.

In the multiplication process, the multiplicands are loaded and the accumulator is set to zero. A timing pulse sends the value of $a_i$ to the readout gate of a series of NDRO cells. This forms the partial product $a_i \times B$ in the accumulator. The number B is then shifted one register and the process is repeated using $a_{i+1}$. After n timing pulses, the accumulator contains the full product $A \times B$.

DETAILED DESCRIPTION OF THE PREFERRED EMBODIMENTS

Figure 1:
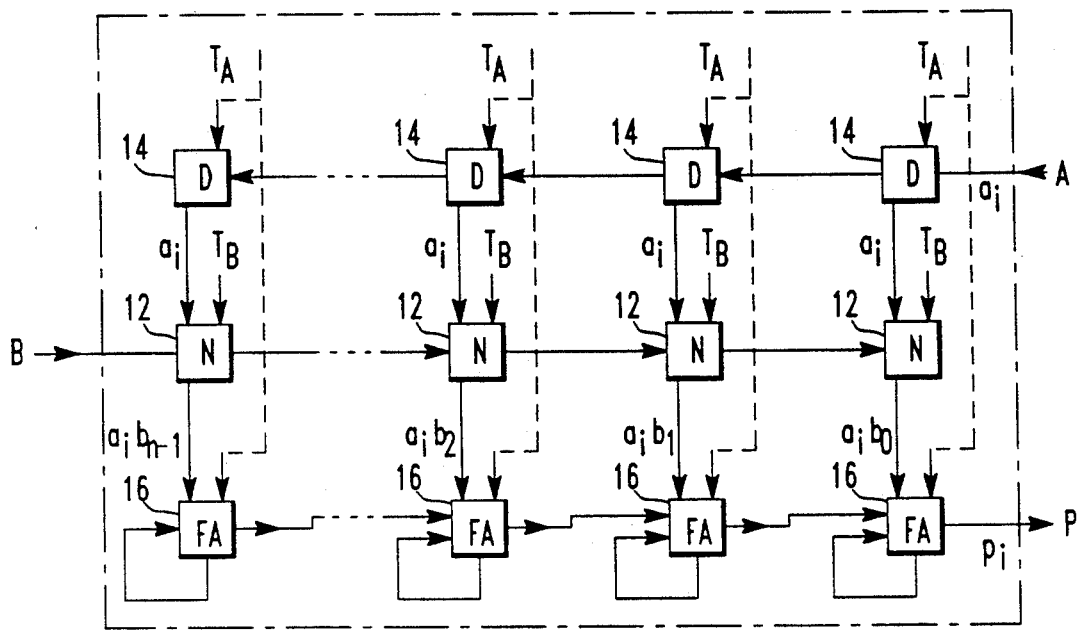
FIG. 1 is a block diagram of a single-flux-quantum serial multiplier of the prior art.
Figure 2:
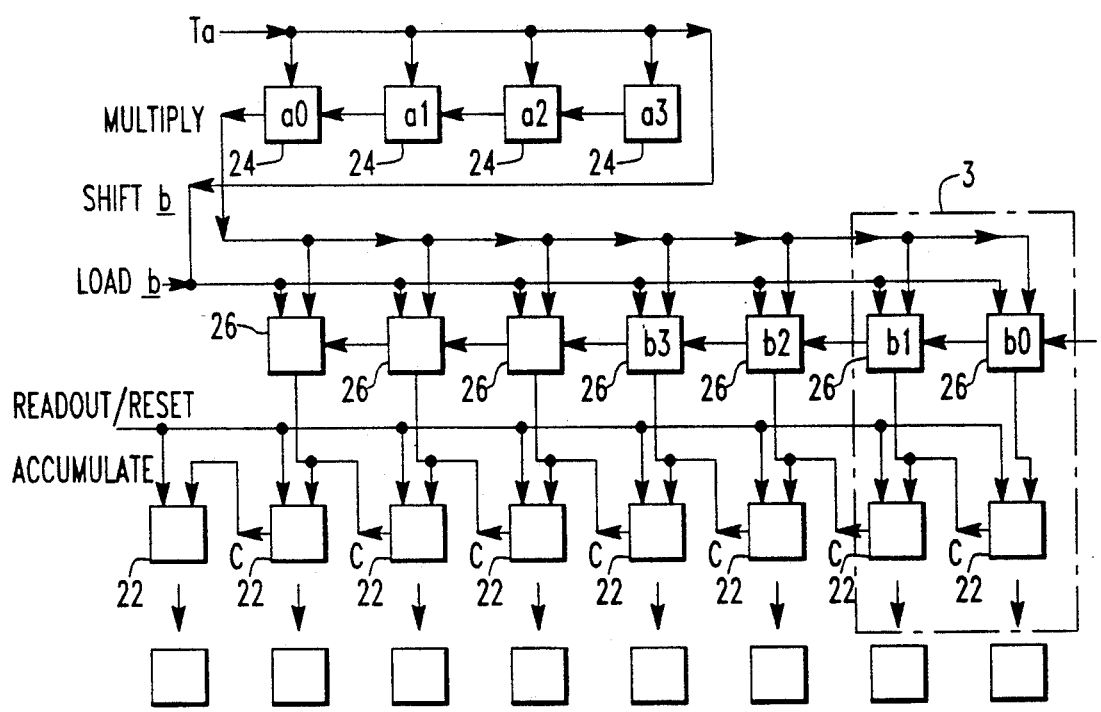
FIG. 2 is a block diagram of a presently preferred embodiment of a single-flux-quantum multiply-accumulator in accordance with the present invention.

A serial multiplier 20 utilizing RSFQ digital processing logic is shown in FIG. 2. FIG. 2 shows the operation of the multiplier 20 of the present invention in carrying out a 4-bit × 4-bit multiplication. The multiplier 20 differs from the prior art multiplier 10 by providing a series of T flip-flop cells 22 in place of full adder cells 16. A string of 2n T flip-flop cells 22 are needed to carry out an n-bit × n-bit multiplication.

Multiplication in multiplier 20 is performed as follows. Multiplicand $A = (a_0, a_1, a_2, a_3)$ is serially loaded into shift register 24. Multiplicand $B = (b_0, b_1, b_2, b_3)$ is serially loaded into a string of NDRO cells 26. The number of cells in the shift register 24 is equal to n, the number of bits in the multiplication. The number of NDRO cells 26 needed in carrying out the multiplication is $2n-1$.

Once the multiplicands A and B are loaded, the accumulator is set to zero. Timing pulse $T_a$ sends the value $a_0$ to the readout gate of each of the NDRO cells 26. This forms the partial product $a_0 \times B = (a_0b_0, a_0b_1, a_0b_2, a_0b_3)$ in the accumulator. Each bit of the multiplicand B is then shifted by timing pulse $T_a$ one register to the left and the process is repeated using $a_1$. After n timing pulses, the accumulator contains the full product $A \times B$. The product bits can then be read out in parallel as the accumulator is reset and the next set of multiplicands is loaded.

Figure 3:
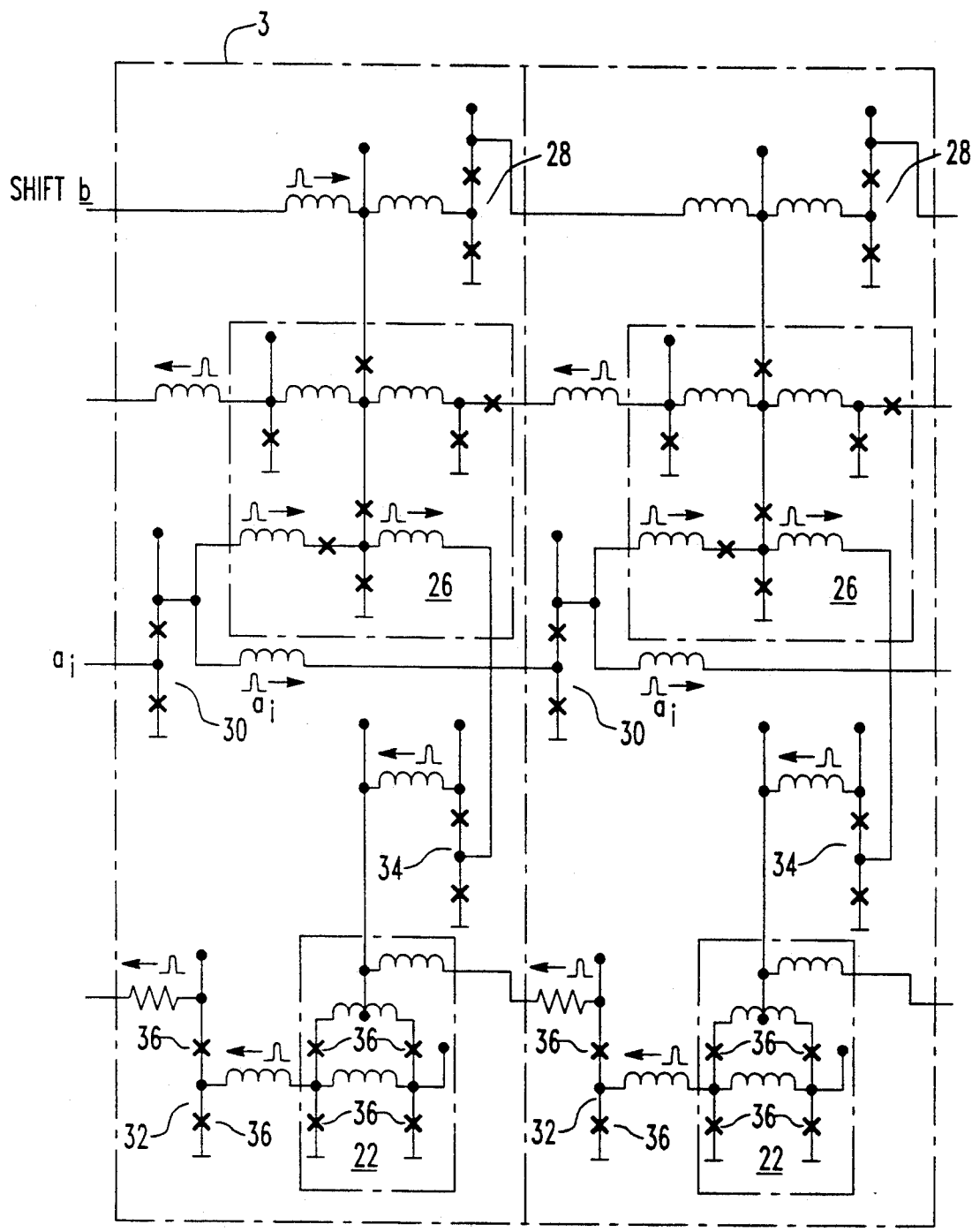
FIG. 3 is a circuit diagram taken of the segment 3 in FIG. 2 showing two bits of the single-flux-quantum multiply-accumulator of FIG. 2.

A circuit diagram showing a two bit segment 3 of the single-flux-quantum multiply-accumulator is shown in FIG. 3. FIG. 3 shows the flow of data pulses from NDRO cells 26 to T flip-flops 22 and the flow of carry pulses between adjacent T flip-flops 22. Single-flux-quantum buffers 28 are included in the data shift path and single-flux-quantum buffers 30 are included in the multiply path to insure that data do not interfere during the multiplication operations. Buffers 32 in the carry path (represented as c in FIG. 2) and buffers 34 in the NDRO-to-T flip-flop path are necessary to direct those respective pulses to the proper flip-flop nodes.

The circuit of FIG. 3 possesses several advantages over the prior art. First, all of the elementary cells shown in the circuit in FIG. 3 are recognized as having good operating margins. DRO cells, shift registers, NDRO cells and T flip-flops have all been modeled using JSIM and other circuit simulation programs and have demonstrated operating margins of approximately 25%. The margins of full adder cells are recognized as being narrow. In addition, whereas each full adder cell of the prior art multiplier 10 requires 22 Josephson junctions, FIG. 3 shows that each T flip-flop 22 including its carry buffer 32 can be formed with only six Josephson junctions 36.

Figure 4:
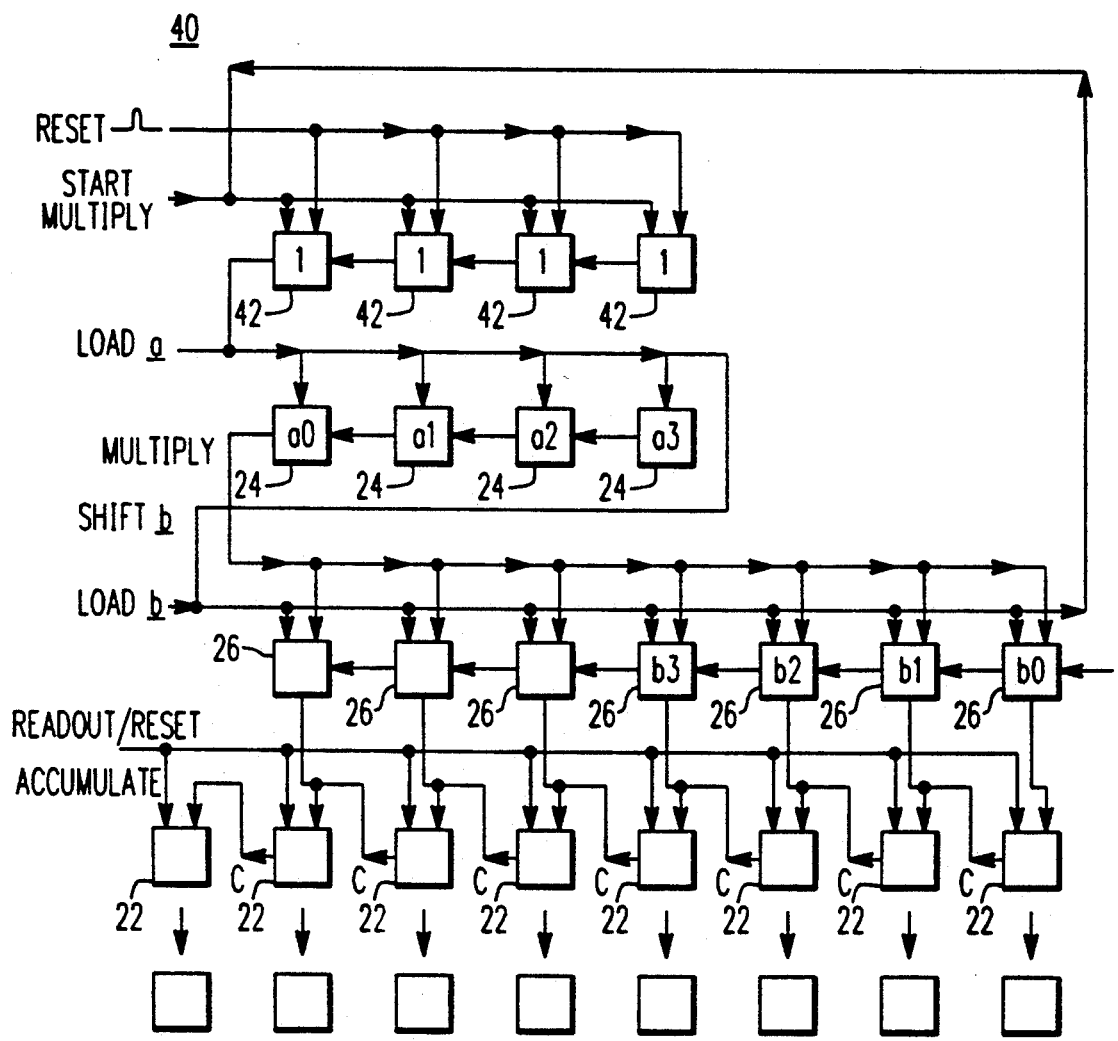
FIG. 4 is a block diagram of a second presently preferred embodiment of the single-flux-quantum multiply-accumulator of the present invention.

FIG. 4 shows a second embodiment of the multiply-accumulator circuit of the present invention in which the entire multiplication is performed with a single timing pulse following the loading of the two n-bit numbers. In the multiply-accumulator 40 of FIG. 4 which contains similar shift register 24, NDRO cells 26 and T flip-flops 22 as multiply-accumulator 20, timing pulse $T_a$ is redirected after performing the partial product to an n-bit shift register 42 which is initially loaded with logic "ONE"s. This timing register 42 generates a timing pulse to initiate the next partial product. When the last partial product is complete, the timing register 42 has been depleted and no additional pulses are generated, thus breaking the cycle. In this manner, only a single timing pulse is needed to complete multiplication. This reduces dead time in the $A \times B$ multiplication, thereby increasing the speed at which the multiplication occurs.

To estimate the potential performance of the circuit of the present invention, an example of the multiplication of two 16-bit numbers will be used. Partial products are performed from most to least significant bit so that the outputs from the NDRO cells 26 do not interfere with the carry pulses C in the accumulator. Similarly, the carry pulses C must be able to ripple through $n+1$ bits of the accumulator prior to beginning the succeeding partial product. The time required for each partial product is $(2n+1)\tau_d$ wherein $\tau_d$ represents the bit-to-bit pulse delay. Typically, $\tau_d$ is between three and five picoseconds. Since n partial products are summed, the time for each multiplication is $(2n^2+n)\tau_d$. For a 16-bit $\times$ 16-bit multiplication, this represents a time corresponding to 0.38 to 0.63 giga operations per second (GOPS) per multiplier.

Figure 5:
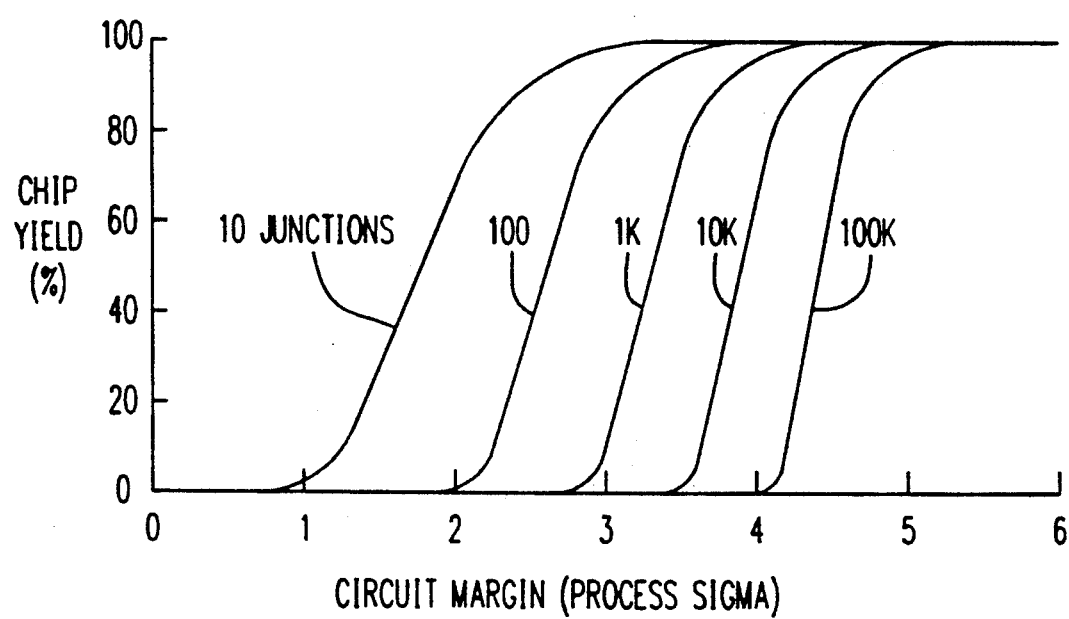
FIG. 5 is a graph showing the effect of circuit margins on chip yields.

Multiply-accumulator 20 is comprised of logic elements which have circuit margins of greater than 25%. The margins of the one-bit full adders 16 used in the serial multiplier 10 are significantly lower. The significance of this is shown in FIG. 5. FIG. 5 is a graph which plots circuit yield versus margins for circuits of varying complexity. In FIG. 5, the margins are measured in units of the standard deviation.

With respect to FIG. 5, an exemplar chip having 10,000 junctions might contain up to ten multiply accumulators as described here. Such a chip might have an output capacity of 5 GOPs. If the circuit margins of the chip are 20% and the desired chip yield is 20%, the standard deviation of junction critical currents must be held to less than 5.3%. Conversely, if the margins are only 10%, the fabrication process must yield junctions with a standard deviation of only 2.6%. Alternatively, if the fabrication process has a standard deviation of 5%, 10,000 junction circuits with margins of 22% will yield nearly all good chips (99%), while circuits with 15% margins will yield less than two good chips in $10^{12}$ chips.

The increased operating margins of multiply-accumulator 20 with respect to prior art multiplier 10 make the fabrication of complex single-flux quantum processors feasible. By using a ripple accumulator based on T flip-flops to replace low-margin full adders of the previous design, a serial multiplier is provided that offers the benefits of RSFQ digital processing and added reliability.

In the foregoing specification certain preferred practices and embodiments of this invention have been set out, however, it will be understood that the invention may be otherwise embodied within the scope of the following claims.

We claim:

1. A serial multiplier for multiplying two n-bit numbers comprising:

a shift register having a total of n destructive read out cells, each of said cells initially containing a separate bit of a first multiplicand and one of said cells serving as an output cell;

a string of $(2n-1)$ non-destructive read out cells, each of said non-destructive read out cells having a read out gate connected to the output cell of the shift register, each of the first n non-destructive read out cells of said string of $(2n-1)$ non-destructive read out cells containing a separate bit of a second multiplicand;

timing means for shifting said bits of said first multiplicand through said shift register whereby each bit of said first multiplicand is serially multiplied with said series of bits of said second multiplicand to form a plurality of partial products;

a string of 2n T flip-flop cells, each of said T flip-flop cells having an input for receiving a bit from each of said partial products and having a carry path to the next adjacent T flip-flop cell; and said timing means moving each bit of said second multiplicand to the next adjacent non-destructive read out cell after each multiplication of a bit of said first multiplicand with said series of bits of said second multiplicand such that said string of 2n T flip flops contains a full product of said first and second multiplicands.

2. The serial multiplier of claim 1 wherein said timing means generates a timing signal which triggers the multiplication of a first bit of said first multiplicand with said series of bits of said second multiplicand.

3. The serial multiplier of claim 2 wherein multiplication of the remaining bits of said first multiplicand with said series of bits of said serial multiplicand occur automatically.

4. The serial multiplier of claim 2 wherein said timing means generates a separate timing signal to trigger each multiplication of the remaining bits of said first multiplicand with said series of bits of said second multiplicand.

5. A method for multiplying two n-bit numbers comprising the steps of:

loading each bit of a first multiplicand into a separate cell of a shift register containing n destructive read out cells;

loading each bit of a second multiplicand into a separate cell of a string of (2n−1) nondestructive read-out cells, said bits being loaded into the first n cells of said string of (2n−1) cells;

performing a series of n multiplications of each bit of said first multiplicand with said series of bits of said second multiplicand;

moving each bit of said second multiplicand to the next adjacent non-destructive read out cell after each multiplication of each said bit of said first multiplicand with said series of bits of said second multiplicand;

delivering each of said series of n multiplications to a string of 2n T flip-flop cells; and adding the totals of said n series of multiplications in said T flip-flop cells.

6. The method of claim 5 wherein step of performing a series of n multiplications includes the step of producing a timing signal wherein said timing signal triggers the multiplication of a first bit of said first multiplicand with said series of bits of said second multiplicand, the product of each multiplication being added in a separate T flip-flop cell of a string of 2n T flip-flop cells, said timing signal shifting each bit of said second multiplicand to the next adjacent cell.

7. The method of claim 6 wherein said timing signal triggers a plurality of signals, each of said plurality of signals triggering a separate multiplication of a bit of said first multiplicand with said series of bits of said second multiplicand.

* * * * *